United States Patent
Zhu et al.

(10) Patent No.: US 8,089,758 B2
(45) Date of Patent: Jan. 3, 2012

(54) ELECTRONIC DEVICE

(75) Inventors: Hong-Wei Zhu, Shenzhen (CN);
Chieh-Yu Lee, Taipei Hsien (TW);
Hai-Yang Yu, Shenzhen (CN);
Er-Zheng Zhao, Shenzhen (CN)

(73) Assignees: **Hong Fu Jin Precision Industry
(ShenZhen) Co., Ltd.**, Shenzhen,
Guangdong Province (CN); **Hon Hai
Precision Industry Co., Ltd.**, Tu-Cheng,
New Taipei (TW)

( * ) Notice: Subject to any disclaimer, the term of this patent is extended or adjusted under 35 U.S.C. 154(b) by 300 days.

(21) Appl. No.: 12/616,792

(22) Filed: Nov. 12, 2009

(65) Prior Publication Data

US 2010/0295426 A1 Nov. 25, 2010

(30) Foreign Application Priority Data

May 19, 2009 (CN) .............................. 200910302441

(51) Int. Cl.
*G06F 1/16* (2006.01)
*G06F 3/02* (2006.01)
*A47B 81/00* (2006.01)

(52) U.S. Cl. ......... 361/679.58; 361/679.55; 361/679.56; 361/679.09; 361/679.27; 312/223.1; 312/223.2; 345/169; 345/905

(58) Field of Classification Search ........... 361/679.01–679.45, 679.55–679.59; 312/223.1, 223.2; 16/221–392; 345/156, 345/157, 168, 169, 905
See application file for complete search history.

(56) References Cited

U.S. PATENT DOCUMENTS

| | | | | |
|---|---|---|---|---|
| 5,200,913 | A * | 4/1993 | Hawkins et al. | 361/679.09 |
| 5,548,478 | A * | 8/1996 | Kumar et al. | 361/679.27 |
| 7,019,964 | B1 * | 3/2006 | Maskatia et al. | 361/679.27 |
| 7,106,579 | B2 * | 9/2006 | Maskatia et al. | 361/679.28 |
| 7,158,634 | B2 * | 1/2007 | Eromaki | 379/433.13 |
| 2004/0062000 | A1 * | 4/2004 | Duarte | 361/683 |
| 2005/0104847 | A1 * | 5/2005 | Tanaka et al. | 345/156 |
| 2006/0244700 | A1 * | 11/2006 | Sano et al. | 345/87 |
| 2008/0180892 | A1 * | 7/2008 | Lai | 361/680 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

An electronic device includes a body, a cover, a sliding apparatus, and a latch assembly. The body defines two sliding slots. The sliding apparatus is received in the slots and is slidable relative thereto. The cover is foldable on the body and is rotatably coupled to the sliding apparatus. The latch assembly is fixed to the sliding apparatus. When the latch assembly clasps the body, the sliding apparatus is unlatched from the electronic device, and the cover is slidable relative to the body and is unfolded while the cover slides away from the body.

13 Claims, 9 Drawing Sheets

ELECTRONIC DEVICE

BACKGROUND

1. Technical Field

The disclosure relates to electronic devices, and more particularly, to an electronic device having a latch assembly.

2. Description of Related Art

Portable electronic devices, such as foldable laptop computers, are in widespread use. Keyboards are provided to receive user inputs. Recently, however, many laptop computers include touch sensitive displays. Users can touch/contact the touch sensitive displays using one or more fingers for all inputs. Using the same conventional foldable technology, users have to unfold the display to get access to the touch/contact screen. This is an inconvenience. Therefore, there is room for improvement in the art.

BRIEF DESCRIPTION OF THE DRAWINGS

The components of the drawings are not necessarily drawn to scale, the emphasis instead being placed upon clearly illustrating the principles of an electronic device. Moreover, in the drawings, like reference numerals designate corresponding parts throughout several views.

DETAILED DESCRIPTION

Figure 1:
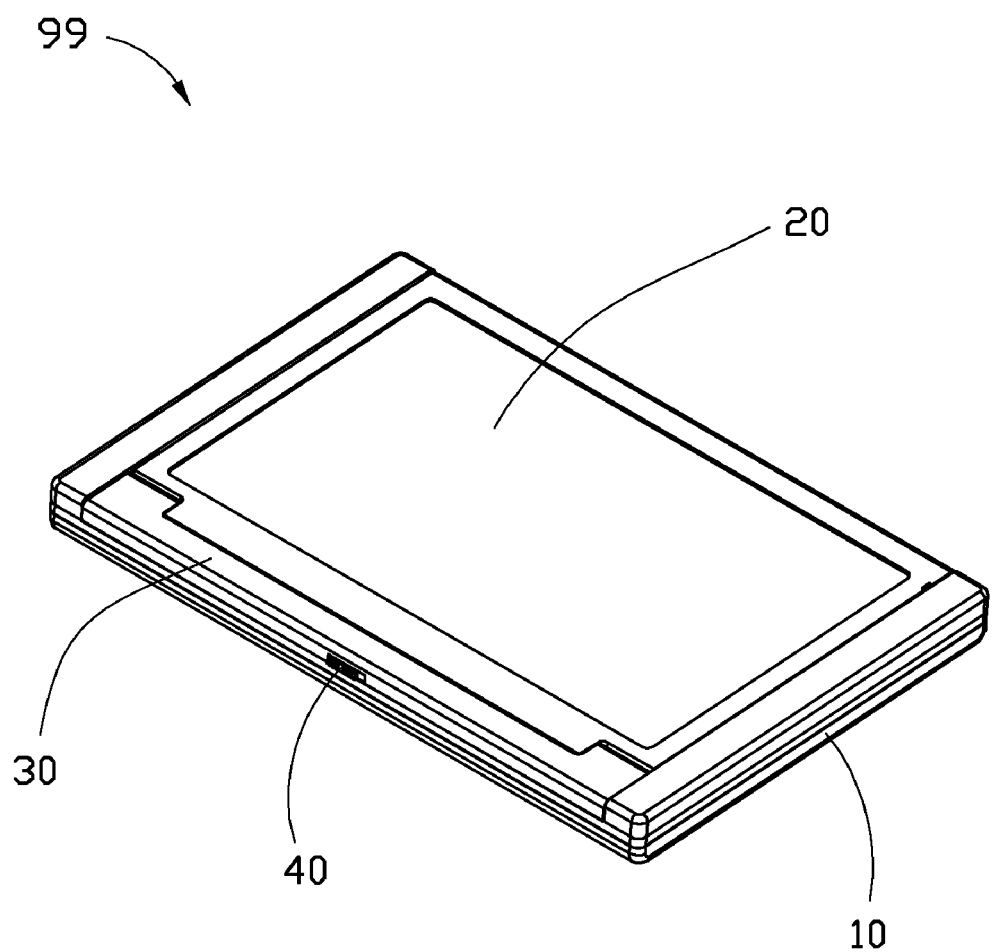
FIG. 1 is a perspective view of an electronic device in accordance with an embodiment, the electronic device including a body, a cover, a sliding apparatus, and a latch assembly having a latching member.

FIGS. 1-4 show an electronic device 99 in accordance with an embodiment. The electronic device 99 includes a body 10, a cover 20, a sliding apparatus 30, and a latch assembly 40. The sliding apparatus 30 is slidably coupled to the body 10. The cover 20 is rotatably coupled to the sliding apparatus 30. The cover 20 is foldably coupled to the body 10 via the sliding apparatus 30. The latch assembly 40 is installed on the sliding apparatus 30 and is configured to latch and unlatch the sliding apparatus 30 with the body 10.

The body 10 is substantially rectangular. The body 10 includes a base board 120, two protruding walls 122, and two rims 124. The two rims 124 are configured at two sides of the base board 120. The two protruding walls 122 protrude upwardly from opposite sides of the base board 120 and are perpendicular to the two rims 124. Each protruding wall 122 defines a sliding slot 160 immediately adjacent the base board 120 and facing the other sliding slot 160. The sliding slots 160 extend from one of the rims 124 to the other. Two ends of the sliding apparatus 30 are correspondingly received in the two slots 160 and are slidable along the sliding slots 160. There are two blocking walls (not labeled) configured at ends of each slot 160 for preventing the sliding apparatus 30 from sliding off of ends of the slot 160. The cover 20 is confined in the sliding slots 160 when the cover 20 is inserted in the slots 160. The base board 120 defines two notches 126, 128. The notches 126, 128 are adjacent to the rims 124 correspondingly. A line (not shown) connecting the two notches 126, 128 is parallel to the sliding slots 160.

The body 10 further includes an input device 180. The input device 180 is operated to provide inputs to the electronic device 99. The input device 180 is fixed to the base board 120. The input device 180 is surrounded by the slots 160 and the notches 126, 128. In the embodiment, the input device 180 is a keyboard.

The sliding apparatus 30 defines an elongated strip slit 341. The sliding apparatus 30 includes a first portion 32, and a second portion 34. The first portion 32 is fixed to the second portion 34. The first portion 32 includes a sidewall 321. The sidewall 321 is on a side of the first portion 32 opposite to the elongated strip slit 341. The sidewall 321 defines a recess 322. Further referring to FIGS. 5-6, the sidewall 321 further defines a rectangular opening 324 in a bottom of the recess 322. The first portion 32 further defines an elongated opening 3290. A positioning post 328 protrudes from the first portion 32. Two pivot rods 342 (see FIG. 4) are fixed to the second portion 34, and are disposed at opposite ends of the elongated strip slit 341. The second portion 34 defines an elongated through hole 346. A positioning pin 348 protrudes upwardly from the second portion 34 and is adjacent to the elongated through hole 346. The positioning pin 348 engages into the positioning post 328. The length of the positioning post 328 is substantially equal to the height of the sidewall 321. The length of the sliding apparatus 30 is longer than the distance of the two protruding walls 122.

Figure 4:
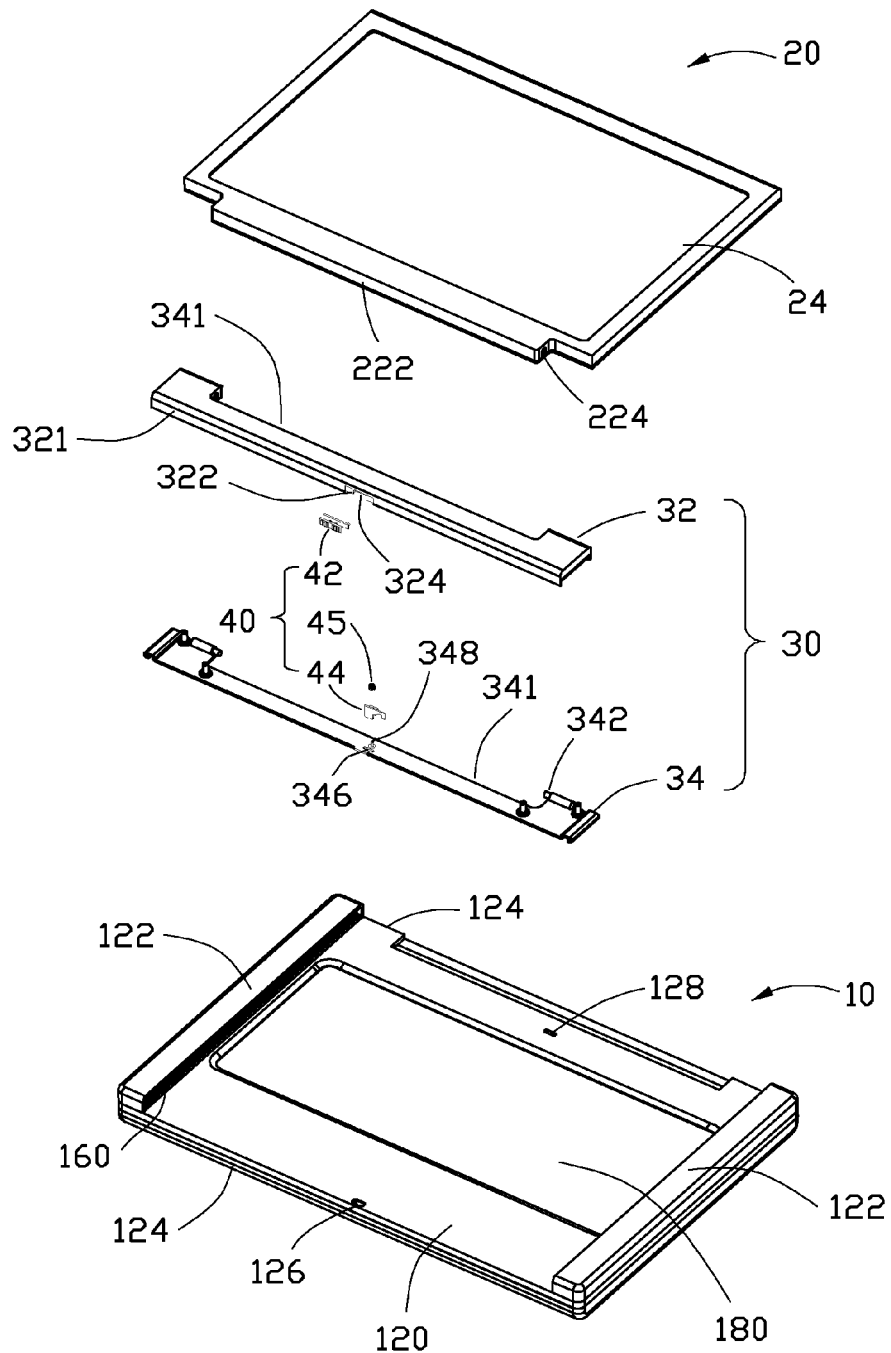
FIG. 4 is a disassembled perspective view of the electronic device shown in FIG. 1.

Referring to FIG. 4, the cover 20 is substantially rectangular. A display 24 is fixed to the cover 20. In the embodiment, the display 24 is a touch sensitive display for receiving touch inputs. A connecting board 222 protrudes from the cover 20. The connecting board 222 is received in the elongated strip slit 341. Two ends of the connecting board 222 define round holes 224 correspondingly. The round holes 224 are configured to receive the pivot rods 342, such that the cover 20 is rotatably connected to the sliding apparatus 30. The thickness of the cover 20 is substantially less than the width of the sliding slots 160.

Figure 5:
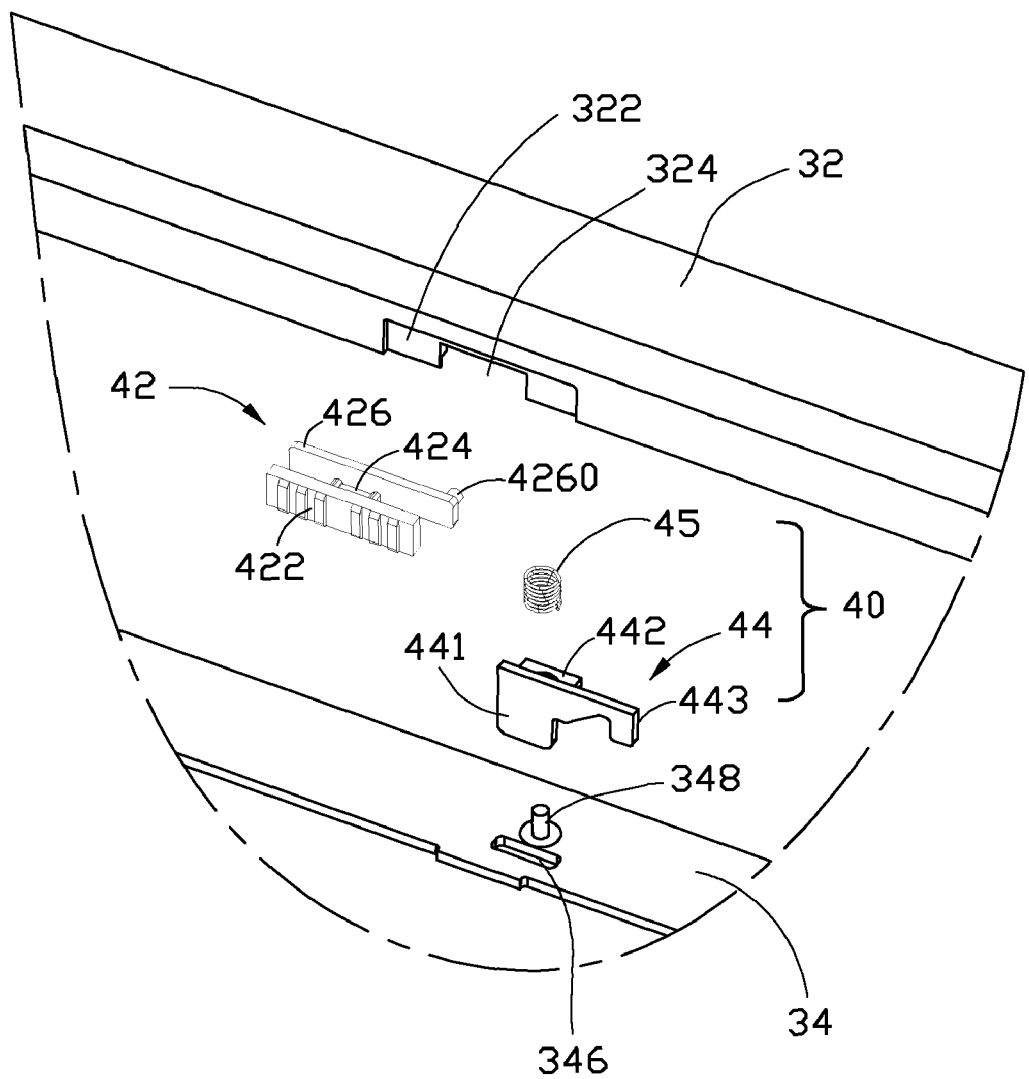
FIG. 5 is a partial, enlarged, disassembled perspective view of the latch assembly as shown in FIG. 4.
Figure 6:
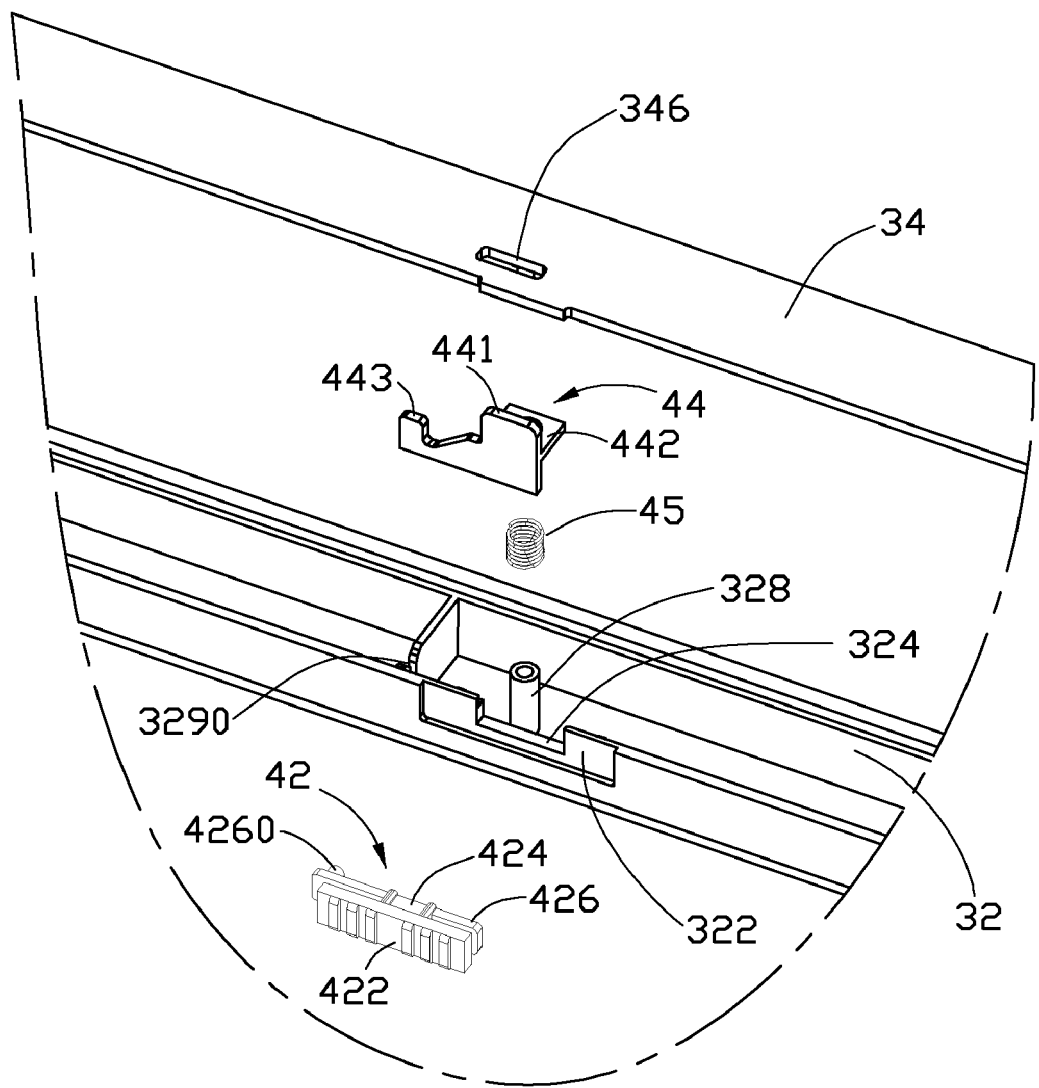
FIG. 6 is similar to FIG. 5, but viewed from another aspect.
Figure 7:
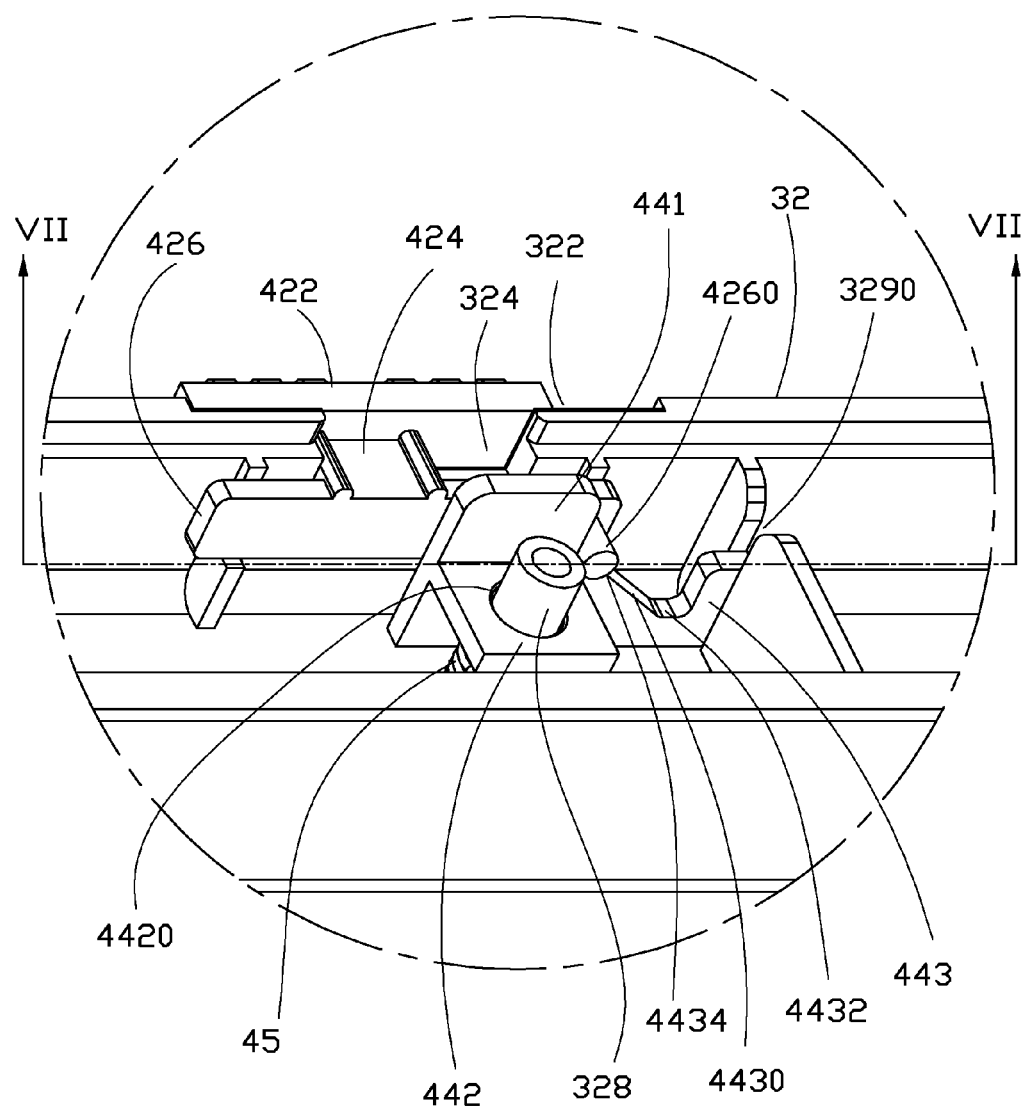
FIG. 7 is an enlarged perspective view of the latch assembly of the electronic device of FIG. 1, while the latch assembly is fixed to the sliding apparatus.

The latch assembly 40 includes a driving portion 42, a clasping portion 44, and an elastic element 45. Referring also to FIGS. 5-7, the driving portion 42 includes an actuating member 422, a connecting member 424, and a driving member 426. The actuating member 422 is coupled to the driving member 426 via the connecting member 424. A driving post 4260 protrudes from one end of the driving member 426. The clasping portion 44 includes a latching member 441, a sleeve member 442, and a hook 443. The hook 443 and the latching member 441 are coplanar. The sleeve member 442 is perpendicular to the latching member 441. The sleeve member 442 defines a round through hole 4420. The round through hole 4420 is configured to receive the positioning post 328. The hook 443 defines an inclined surface 4430. The inclined surface 4430 includes an upper portion 4432, and a lower portion 4434.

In assembly, the elastic element 45 is sleeved on the positioning post 328. The positioning post 328 further extends through the round through hole 4420, such that the clasping portion 44 sleeves on the positioning post 328. The hook 443 is limited in the elongated opening 3290. The driving portion 42 is mounted in the opening 324 in a manner such that the sidewall 321 is sandwiched between the actuating member 422 and the driving member 426 and that the driving post 4260 resists against the inclined surface 4430. The positioning pin 348 fits into the posting post 328, the latching member 441 extends through the elongated through hole 346, and the second portion 34 covers on the first portion 32 via a plurality of securing members, such as, bolts. The pivot rods 342 are received in the round holes 224 correspondingly, such that the cover 20 is rotatably connected to the sliding apparatus 30. The sliding apparatus 30 is further received in the sliding slots 160.

After assembly, the notches 126, 128, the elongated through hole 346, and the latching member 441 are in a same plane. The clasping portion 44 is limited between the first portion 32 and the second portion 34, and slides upwardly or downwardly relative to the positioning post 328. The driving portion 42 is sandwiched between the first portion 32 and the second portion 34, and slides back and forth relative to the recess 322, such that the driving post 4260 is driven to move back and forth when the actuating member 422 is drawn.

Figure 8:
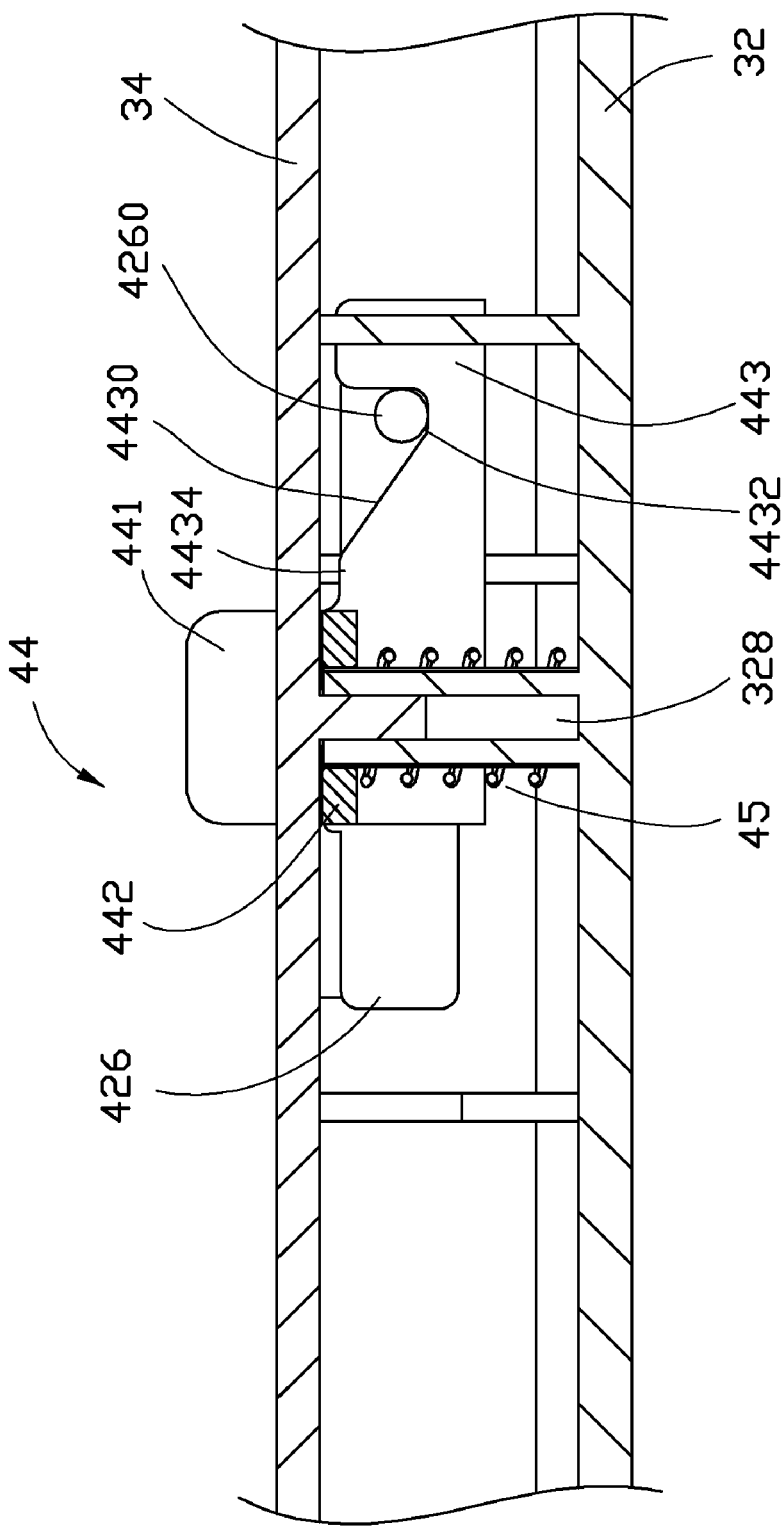
FIG. 8 is a cross-sectional view taken along line VII-VII of FIG. 7, showing the latching member extends out of the sliding apparatus.

Referring to FIG. 8, when the driving post 4260 reaches to the upper portion 4432, the elastic element 45 deforms slightly and drives the sleeve member 442 to touch an inner surface of the second portion 34, and the latching member 441 extends outside of the sliding apparatus 30.

Figure 9:
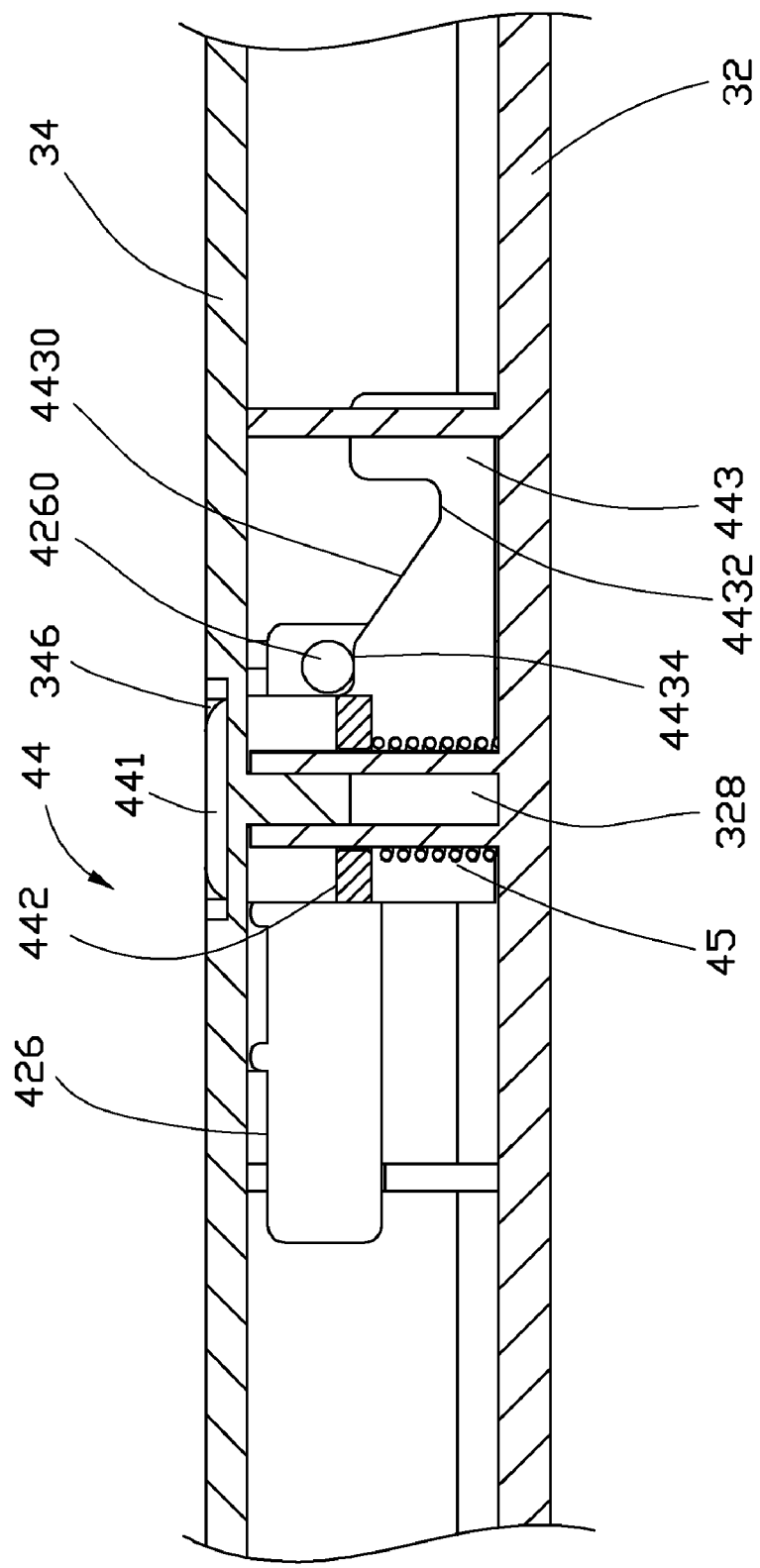
FIG. 9 is similar to FIG. 8, but shown the latching member is inserted into the sliding apparatus.

Referring to FIG. 9, when the driving post 4260 is drawn from the upper portion 4432 to the lower portion 4434, the clasping portion 44 slides downwardly relative to the positioning post 328, and the elastic element 45 deforms elastically to store an elastic energy, as a result, the latching member 441 is inserted in the sliding apparatus 30. When the driving post 4260 is drawn from the lower portion 4434 to the upper portion 4432, the elastic element 45 rebounds to release the elastic energy, thus, driving the latching member 441 to extend out of the sliding apparatus 30.

Referring to FIG. 1, the electronic device 99 is in a folded state. In the folded state, the latching member 441 extends out of the sliding apparatus 30 and is received in the notch 126. As a result, the sliding apparatus 30 is latched to the body 10, and the cover 20 is inserted in the slots 160 and covers on the top of the body 10. In the folded state, the electronic device 99 is capable of being configured to be operated in a compact fashion, and the touch sensitive display 24 is used for receiving touch inputs.

Figure 2:
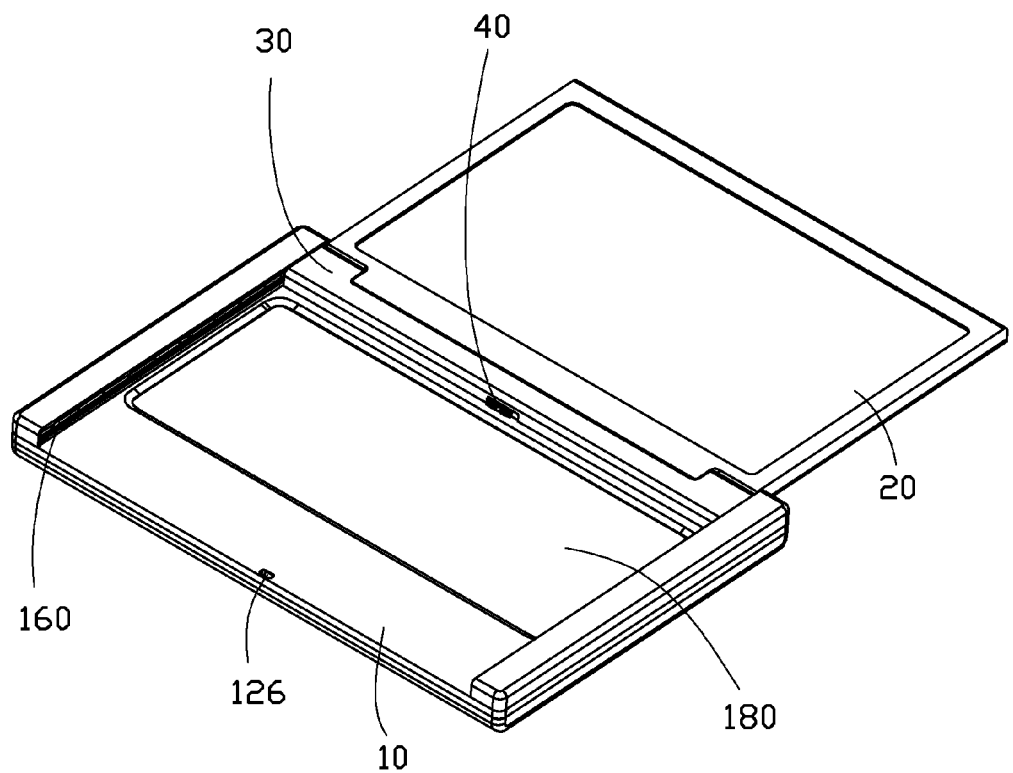
FIG. 2 is a perspective view of the electronic device of FIG. 1, while the cover slides open relative to the body.
Figure 3:
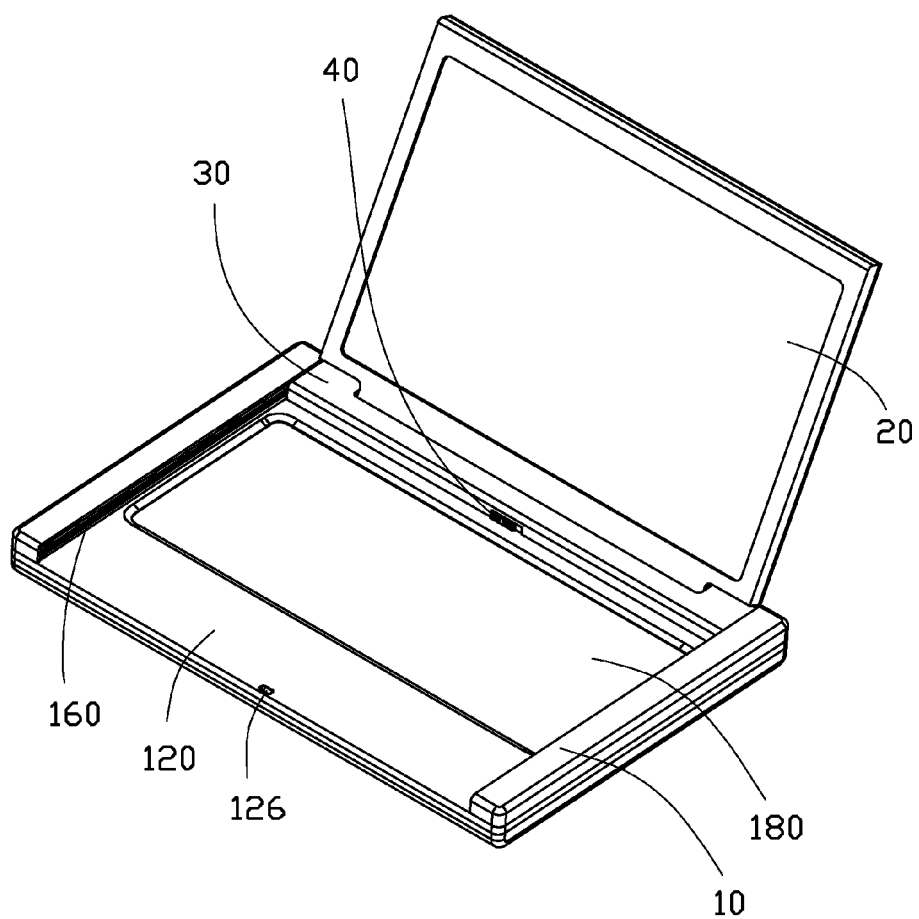
FIG. 3 is a perspective view of the electronic device of FIG. 2, while the cover further rotates on the sliding apparatus.

Referring to FIGS. 2-3, when the electronic device 99 is to be used, the sliding apparatus 30 is unlatched from the body 10 by operating the latch assembly 40 to push the latching member 441 into the sliding apparatus 30. The sliding apparatus 30 and the cover 20 slide toward the notch 128. When the latch assembly 40 is aligned with the notch 128, the cover 20 slides out of the slots 160, and the latching member 441 is operated to extend out of the sliding apparatus 30 and is received in the notch 128, as a result, the sliding apparatus 30 becomes latched to the body 10 again. Afterwards, the cover 20 is rotated to a desired angle relative to the body 10, and the electronic device 99 is unfolded and is in a foldable fashion. When the electronic device 99 is in the foldable fashion, the input device 180 is operated to provide inputs to the electronic device 99.

When folding the electronic device 99, firstly, rotate the cover 20 until the cover 20 and the sliding apparatus 30 are coplanar. Secondly, operate the latch assembly 40 to push the latching member 441 into the sliding apparatus 30, and slide the sliding apparatus 30 and the cover 20 toward the notch 126, such that the sliding apparatus 30 and the cover 20 are inserted into the slots 160. Then, extend the latching member 441 out of the sliding apparatus 30 to latch the sliding apparatus 30 to the body 10. Therefore, the electronic device 99 is folded.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device, comprising: a body defining two sliding slots and comprising at least one latching portion; a sliding apparatus received in the two sliding slots and slidable relative thereto; a cover rotatably coupled to the sliding apparatus and confined between the two sliding slots; and a latch assembly fixed to the sliding apparatus; wherein when the cover slides away from the two sliding slots, the latch assembly is operated to fasten with the at least one latching portion, the sliding apparatus is latched to the body, and the cover is rotatable relative to the sliding apparatus; wherein the body comprises a first locking portion and a second locking portion, the first locking portion and the second locking portion are located at a first end and a second end opposite to the first end of the body, the cover is capable of being moved from the first end to the second end by sliding the sliding apparatus in the two sliding slots, wherein both at the first end and the second end, the latch assembly is operated to fasten with the first locking portion and the second locking portion, thereby when the latch assembly is fastened with the first locking portion, the electronic device is capable of being configured to operate in a compact fashion, and when the latch assembly is fastened with the second locking portion, the electronic device is capable of being configured to operate in a foldable fashion; and wherein the latch assembly further comprises a driving portion, a clasping portion, and an elastic element, the elastic element is elastically coupled to the clasping portion, the driving portion resists against the clasping portion and is configured to drive the clasping portion to press the elastic element.

2. The electronic device of claim 1, wherein the clasping portion comprises a hook, the driving portion comprises an actuating member, a connecting member, and a driving member, the driving member is fixed to the actuating member via the connecting member, a driving post protrudes from the driving member, the driving post resists against the hook.

3. The electronic device of claim 2, wherein the hook comprises an inclined surface, the driving post resists against the inclined surface and is slidable relative thereto.

4. The electronic device of claim 1, wherein the sliding apparatus comprises a first portion, and a second portion, the first portion is fixed to the second portion, and the latch assembly is sandwiched between the first portion and the second portion.

5. The electronic device of claim 4, wherein a positioning post protrudes from the first portion, the second portion defines a through hole, the latch assembly sleeves on the positioning post, and the latch assembly is capable of extending out of and being inserted into the through hole.

6. An electronic device capable of being moved between an unfolded state and a folded state, the electronic device comprising: a first electronic member; a second electronic member slidably and rotatably coupled to the first electronic member; and a sliding apparatus for connecting the first electronic member with the second electronic member, the sliding apparatus comprising a latch assembly; wherein the second electronic member is capable of assuming a first position and a second position relative to the first electronic member via the latch assembly, wherein at the first position, the second electronic member substantially covers the first electronic member, and at the second position the second electronic member is rotatable relative to the first electronic member; wherein two opposite ends of the first electronic member define two slots correspondingly, the second electronic member and the sliding apparatus are confined between the two slots and slidable relative thereto; and wherein the latch assembly further comprises a driving portion, a clasping portion, and an elastic element, the elastic element is elastically coupled to the clasping portion, the driving portion resists against the clasping portion and is configured to drive the clasping portion to press the elastic element.

7. The electronic device of claim 6, wherein the clasping portion comprises a hook, the driving portion comprises an actuating member, a connecting member, and a driving member, the driving member is fixed to the actuating member via the connecting member, a driving post protrudes from the driving member, the driving post resists against the hook.

8. The electronic device of claim 7, wherein the hook comprises an inclined surface, the driving post resists against the inclined surface and is slidable relative thereto.

9. The electronic device of claim 6, wherein the sliding apparatus comprises a first portion, and a second portion, the first portion is fixed to the second portion, and the latch assembly is sandwiched between the first portion and the second portion.

10. The electronic device of claim 9, wherein a positioning post protrudes from the first portion, the second portion defines a through hole, the latch assembly sleeves on the positioning post, and the latch assembly is capable of extending out of and being inserted into the through hole.

11. An electronic device capable of being used in a first manner and in a second manner, the electronic device comprising: a first electronic member defining two sliding slots and comprising at least one latching portion; a sliding apparatus received in the two sliding slots and slidable relative thereto; a second electronic member rotatably coupled to the sliding apparatus and confined between the two sliding slots; and a latch assembly fixed to the sliding apparatus; wherein the electronic device is capable of being operated from a closed state to an opened state, in the closed state, the second electronic member substantially covers the first electronic member and the electronic device is used in the first manner, in the opened state, the second electronic member is rotatable relative to the first electronic member and the electronic device is used in the second manner; and wherein the latch assembly further comprises a driving portion, a clasping portion, and an elastic element, the elastic element is elastically coupled to the clasping portion, the driving portion resists against the clasping portion and is configured to drive the clasping portion to press the elastic element.

12. The electronic device of claim 11, wherein the second electronic member is a touch sensitive display, when the electronic device is in the closed state, the touch sensitive display is operated as a first input device to receive touch inputs.

13. The electronic device of claim 11, wherein the first electronic member comprises a second input device, the second input device is sandwiched between the first electronic member and the second electronic member when the electronic device is in the closed state, and the second input device is operated to provide inputs to the electronic device when the electronic device is in the opened state.

* * * * *